United States Patent [19]
Tanaka

[11] 3,790,834
[45] Feb. 5, 1974

[54] LOW SPEED SYNCHRONOUS MOTOR

[76] Inventor: Tetsuro Tanaka, 2, Shimo-Kamo Yako-cho, Sadyo-ku, Kyoto-shi, Japan

[22] Filed: Nov. 11, 1971

[21] Appl. No.: 197,872

[30] Foreign Application Priority Data
Nov. 21, 1970  Japan.............................. 45/102415
Aug. 4, 1971  Japan................................ 46/58332

[52] U.S. Cl................. 310/162, 310/156, 310/257
[51] Int. Cl. .......................................... H02k 19/02
[58] Field of Search............. 310/156, 41, 162–164, 310/257

[56] References Cited
UNITED STATES PATENTS

| | | | |
|---|---|---|---|
| 3,330,975 | 7/1967 | Osterwalder | 310/164 |
| 2,432,573 | 12/1947 | Jorgensen | 310/164 |
| 3,132,271 | 5/1969 | Midgley | 310/162 |
| 3,621,312 | 11/1971 | Palmero | 310/163 X |
| 2,437,142 | 3/1948 | Welch et al. | 310/164 |
| 3,014,141 | 12/1961 | Riggs | 310/164 X |
| 2,951,957 | 9/1960 | Eigeman | 310/164 |
| 3,059,131 | 10/1962 | Everard et al. | 310/164 |

*Primary Examiner*—D. E. Duggan
*Attorney, Agent, or Firm*—Richard C. Sughrue et al.

[57] ABSTRACT

A plurality of stationary poles, each comprising a pair of sub-poles, are disposed in opposite relationship with a plurality of rotor magnet poles. The ratio of the number of stationary poles to the number of rotor magnet poles is chosen to be 2:3, 2:5 or 3:5 alternatively. A rotating magnetic field is produced in the array of stationary poles, and for every $\pi/2$ interval of the period thereof, the rotor maintains a stabilized position in which there exists at least one set of a stationary sub-pole and a rotor pole of opposite polarities and attracted to each other. Also in this position, there exist an even number of sets of one sub-pole of a stationary pole and a rotor pole which are of like polarity, are displaced in angular position from each other and repel each other, these different sets producing a balance between their rotating efforts acting upon the rotor.

7 Claims, 52 Drawing Figures

PRIOR ART

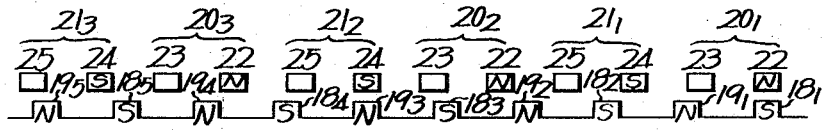
Fig-19A
Fig-19B
Fig-19B'
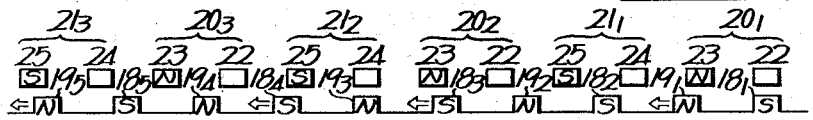
Fig-19C
Fig-19C'
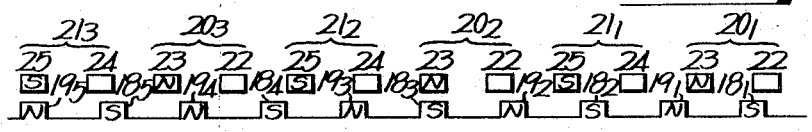
Fig-19D
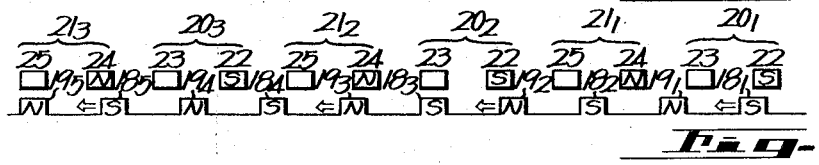
Fig-19D'
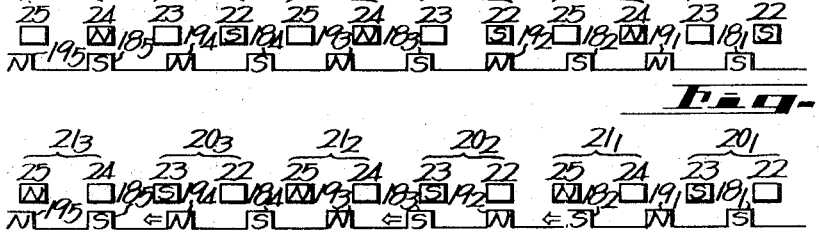
Fig-19E
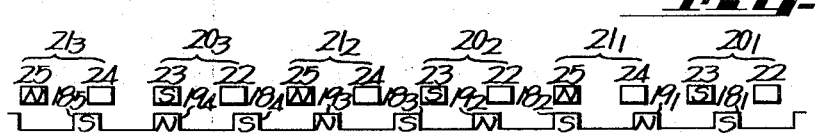
Fig-19E'

LOW SPEED SYNCHRONOUS MOTOR

BACKGROUND OF THE INVENTION

The invention relates to a synchronous motor of small size and low rotating speed suitable for use in watches, clocks, compact timers of various home electrical appliances, measuring instruments and automatic control systems as servo-motor or the like.

Rotary machines incorporating such a synchronous motor customerily employ a reduction gearing for reducing the rotational output therefrom. The use of a reduction gearing increases the cost and causes noises and troubles or failure. A reduction in the rotational speed of the synchronous motor itself would be a solution for this by allowing the reduction gearing to be greatly simplified or even eliminated, thereby reducing the occurrence of failure and noises. The synchronous motor may have its rotational speed reduced by increasing the number of poles provided. However, such an increase in the number of poles is limited, and particularly for small motors, various technical and economical complications are introduced in so doing.

A motor used in a clock usually comprises a hysteresis motor in view of its attainable accuracy of synchronization with the supply frequency. In a hysteresis motor of the prior art, the amount of rotation of the rotor for one period of the drive current corresponds to twice the pole pitch. A resulting speed of rotation requires the use of a reduction gearing when using such motor as a drive motor of a clock.

Therefore, it is an object of the invention to provide a low speed synchronous motor.

It is another object of the invention to provide a low speed synchronous motor which is small in size and still can be manufactured readily and inexpensively.

It is a further object of the invention to provide a synchronous motor which provides a low speed of rotation with a reduced number of poles.

It is still another object of the invention to provide a synchronous motor having a speed of rotation which is one-fifth that of the hysteresis motor of the prior art for the same number of stationary poles used.

SUMMARY OF THE INVENTION

In accordance with the invention, a rotor is formed with a plurality of magnet poles which are equiangularly spaced around the shaft thereof, and a stator comprises a plurality of stationary poles equi-angularly spaced around and in opposite relationship with the rotor shaft, each of the stationary poles being constituted by a pair of sub-poles. In the following description, the term "rotor magnet pole" may be abbreviated as rotor pole simply, it being understood that the term rotor pole always refers to a pole on the rotor that is magnetized in itself or is connected with a magnet on the rotor. Means is provided to produce a rotating magnetic field across the stationary poles. The number of poles on the rotor is different from the number of stationary poles on the stator, and the respective numbers of these poles are chosen such that when one of the sub-poles of a stationary pole assumes an N-pole (or S-pole) by virtue of the rotating field, one of the rotor magnet poles having the opposite polarity of S (or N) comes opposite to that sub-pole, by attraction, in correct alignment therewith, there being at least one set of stator sub-pole and rotor pole satisfying such a relationship. In addition, there exist an even number of sets of magnetized sub-poles on the stator which are each associated with a rotor pole located adjacent the magnetized sub-pole and having like polarity as the latter, thus causing a repelling force to act therebetween. The repelling forces of two such sets cancel each other, thereby resulting in a null net rotating effort upon the rotor. Such a rotor position may be referred to herein as a stabilized position.

When the other of the sub-poles of a pair of said stationary pole assumes an N-pole (or S-pole) by rotation of the rotating field, both attracting and repelling forces occur between the stationary poles and the rotor poles to cause a rotation of the rotor in a given direction, and the rotor again assumes a stabilized position at an angular position where there exist at least one attracting set and an even number of repelling sets of stationary sub-poles on the stator and rotor poles. The similar process is repeated with the rotation of the rotating field to cause a rotation of the rotor until the rotating field ceases to rotate, whereupon the rotor comes to rest at a stabilized position.

With the above arrangement, it is assured that the amount of rotation of the rotor for one period of the rotating field is reduced to less than one pitch of the stationary pole, thereby achieving a rotational speed which is slower than that of the conventional hysteresis motor having the same pitch of stationary poles. When the number of stationary poles remains same, a synchronous motor constructed with a stationary pole number to rotor pole number ratio of 2:3 in accordance with the invention has a rotational speed that is one-third that of conventional hysteresis motor. With a ratio of 2:5 or 3:5, the rotational speed can be reduced to one-fifth that of a conventional hysteresis motor.

BRIEF DESCRIPTION OF THE DRAWINGS

Further details of the invention will become apparent from the following description of embodiments thereof taken in connection with the drawings, wherein:

FIG. 19 is a development of the stationary poles and rotor poles of the motor shown in FIG. 18 for illustrating its operation.

DETAILED DESCRIPTION OF THE PREFERRED EMBODIMENTS

Figure 1:
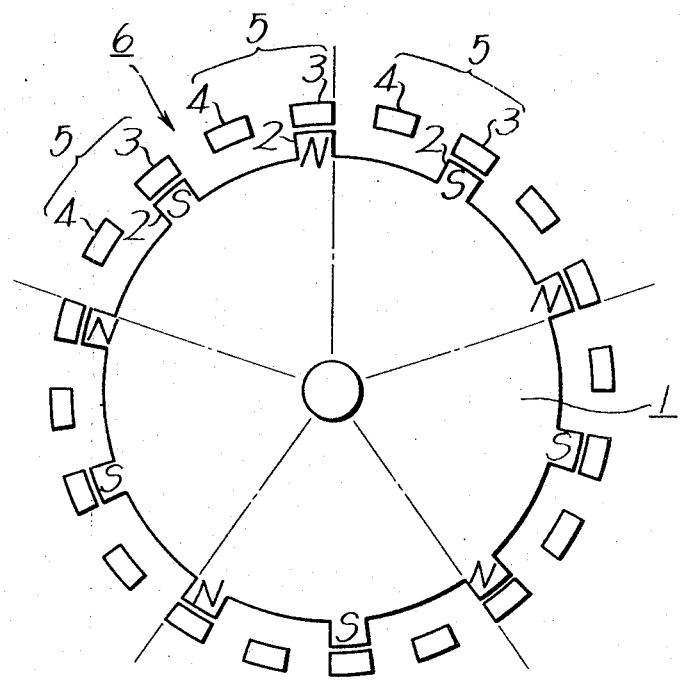
FIG. 1 is a schematic view illustrating a conventional hysteresis motor.
Figure 2A:
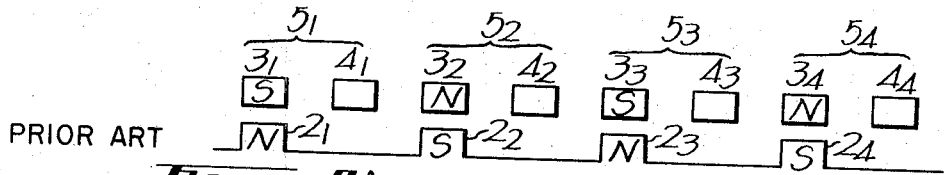
FIG. 2 is a development of the rotor and stator of the hysteresis motor shown in FIG. 1, illustrating its operation.
Figure 2B:
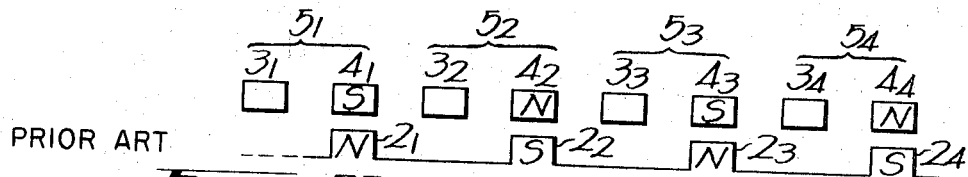
Figure 2C:
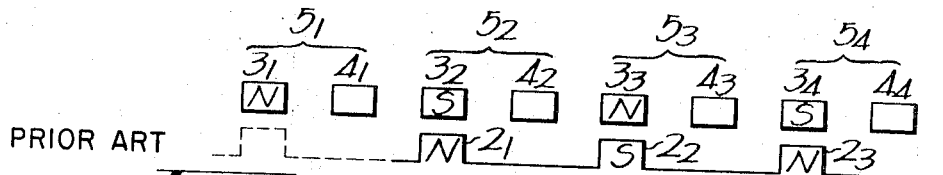
Figure 2D:
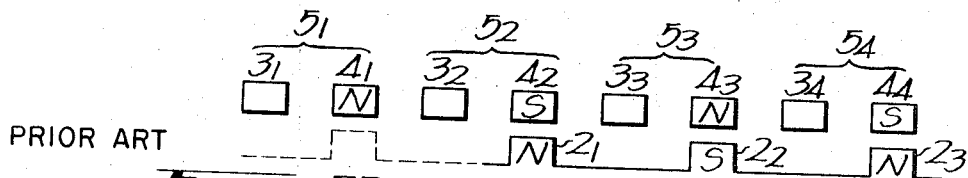
Figure 2E:
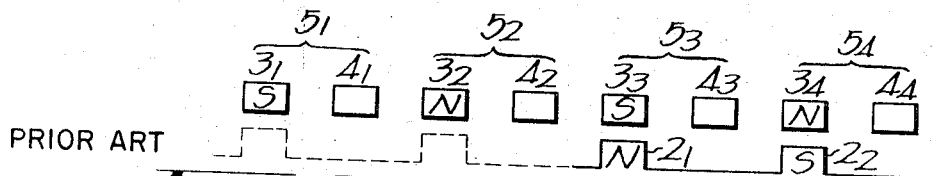

Referring to FIG. 1, there is shown a conventional hysteresis motor having a rotor 1 formed with a plurality of magnet poles 2 equi-angularly spaced apart along its periphery, the poles 2 being alternately magnetized as N- and S-poles. In opposite relationship with the outer periphery of the rotor 1, a plurality of stationary poles 5, each comprising a pair of sub-poles 3 and 4 spaced apart in the direction of rotation of the rotor 1, are arranged with the same angular interval as the poles 2, thereby constituting a stator 6. A rotating field is produced across the stationary poles 5. The relative positioning of the rotor poles 2 and the stationary poles 5 is illustrated by a development in FIG. 2. As shown in FIG. 2A, it is assumed that sub-poles $3_1, 3_3, 3_5 \ldots$ are excited so as to become S-poles while sub-poles $3_2, 3_4, 3_6 \ldots$ are excited to be N-poles, and that rotor poles $2_1, 2_2, 2_3 \ldots$ are positioned opposite to the sub-poles $3_1, 3_2, 3_3 \ldots$ by attraction. As the rotating field varies by an amount of $\pi/2$ from the condition illustrated in FIG. 2A, sub-poles $4_1, 4_3, 4_5 \ldots$ will be S-poles while sub-poles $4_2, 4_4, 4_6 \ldots$ will be N-poles as illustrated in FIG. 2B. Then rotor poles $2_1, 2_2, 2_3 \ldots$ will be attracted by sub-poles $4_1, 4_2, 4_3 \ldots$, respectively, so that the rotor 1 will rotate until the rotor poles come opposite to these respective sub-poles. Further rotation of the rotating field by an amount of $\pi/2$ will cause the sub-poles $3_1, 3_3 \ldots$ and sub-poles $3_2, 3_4 \ldots$ to become N-and S-poles, respectively, whereby the into alignment with sub-poles $3_2, 3_3, 3_4 \ldots$, respectively, as shown in FIG. 2C. Similarly, another $\pi/2$ rotation of the rotating field causes the rotor 1 to assume the position shown in FIG. 2D. Still another $\pi/2$ rotation of the rotating field results in the condition shown in FIG. 2E, which corresponds to the initial condition. Thus rotor poles $2_1, 2_2, 2_3 \ldots$ come opposite to stationary sub-poles $3_3, 3_4, 3_5 \ldots$, respectively. In other words, when the rotating field rotates by a total of $2\pi$, the rotor 1 rotates by an amount corresponding to two pitches of the poles 2, or to two pitches of the stationary poles 5.

Figure 3:
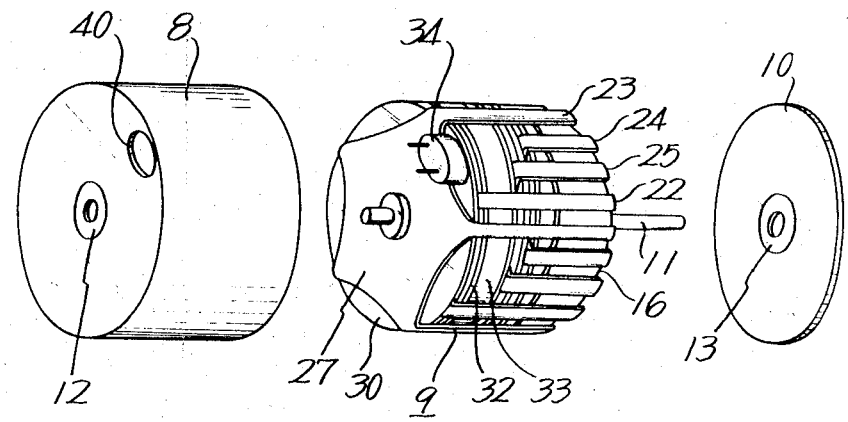
FIG. 3 is an exploded perspective view of an embodiment of the low speed motor constructed in accordance with the invention.

FIG. 3 shows an embodiment of the motor according to the invention. A cylindrical casing 8 is closed at one end, and receives an internal construction 9 therein, the casing 8 being closed by a cover plate 10. Both the casing 8 and the cover plate 10 may be injection moulded from synthetic resin material for the benefits of light weight, low cost and mass production. The internal construction 9 includes a rotary shaft 11 which is rotatably received in bearings 12, 13 integrally formed with the closed end plate of the casing 8 and the cover plate 10, respectively, at the central portions thereof. Bearings 12, 13 are fitted with Teflon members to improve resistance to abrasion and heat, and molybdenum disulfide is coated thereon as lubricant. However, these bearings may comprise more usual construction.

Figure 4:
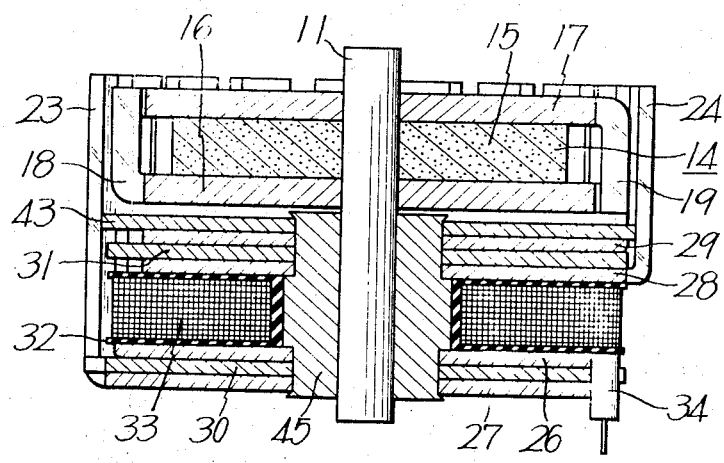
FIG. 4 is a longitudinal section of the motor shown in FIG. 3, showing its internal construction.
Figure 5:
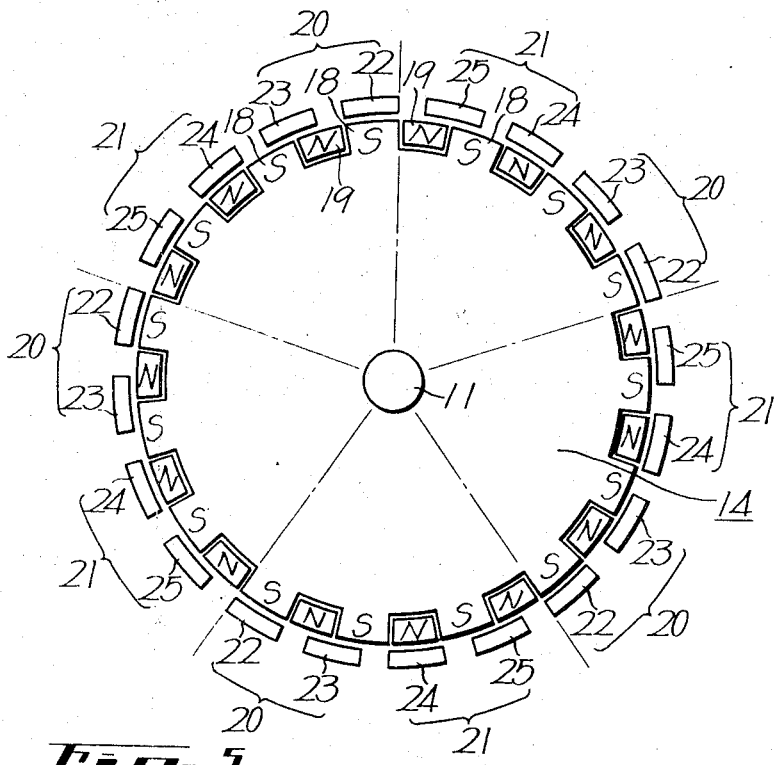
FIG. 5 is a plan view of the motor of FIG. 4.
Figure 6:
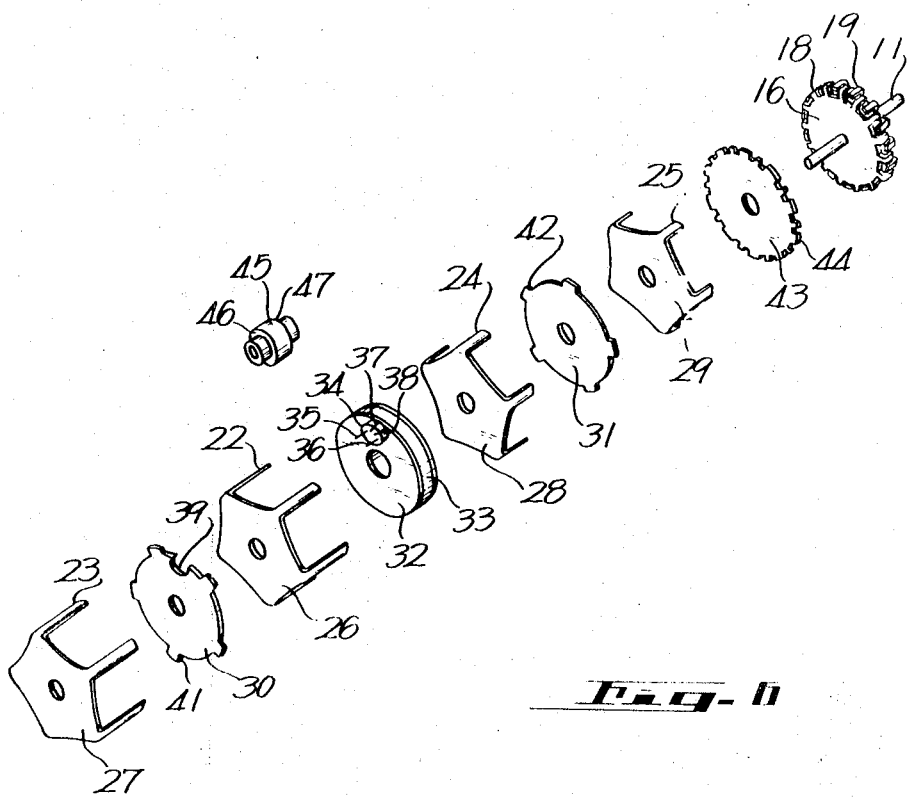
FIG. 6 is an exploded perspective view of the motor of FIGS. 3 to 5.

FIGS. 4 to 6 show an example of the internal construction 9. A rotor 14 is secured on the rotary shaft 11, and comprises a disc-shaped permanent magnet 15 which is axially magnetized, and a pair of pole plates 16 and 17 mounted on the opposite sides of the magnet. As shown in FIGS. 5 and 6, the pole plates 16 and 17 have equi-angularly spaced poles 18 and 19, respectively, which are bent in the opposite directions from the respective plates so as to extend axially at a radius external of the permanent magnet 15. These poles 18 and 19 are angularly displaced from each other by an amount corresponding to one-half the pitch so as to provide an interdigitated structure. The permanent magnet 15 magnetizes the poles 18 and 19 to the opposite polarities, so that N- and S-poles are alternately disposed along the periphery of the rotor 14. While the poles 18 and 19 need not be bent extensions, it is found that the bent poles as described provide a better efficiency.

In opposing relationship with and around the rotor 14 is an array of alternately disposed stationary poles 20 and 21 with an equal angular interval. Each of the stationary poles 20 and 21 consists of a pair of sub-poles 22, 23 or 24, 25 spaced apart in the direction of rotation of the rotor 14. These sub-poles are associated with means for producing a rotating magnetic field thereacross to constitute a stator. In the example shown, a pentagonal magnetic plate 26 has an extension bent at right angles to the same side from each of its apices to form five poles 22, as shown in FIG. 6. In a similar manner, poles 23, 24 and 25 are formed on pentagonal magnetic plates 27, 28 and 29, respectively. The magnetic plates 26 and 27 are combined together, with a shading disc 30 comprising a copper plate interposed therebetween and with a relative angular displacement, to constitute stationary poles 20. In like manner, the magnetic plates 28 and 29 together constitute stationary poles 21, with a shading disc 31 interposed therebetween. Intermediate the magnetic plates 26 and 28 is interposed a bobbin 32 in concentric relationship with the rotary shaft 11, and an exciting coil 33 is wound thereon. Each of the sub-poles 22 to 25 of the stationary poles may have a width which is equal to the width of the rotor poles 18, 19. Alternatively, the poles 18, 19 may have a slightly greater width for improved efficiency. opposite On one face of the bobbin 32 is integrally formed a projecting terminal board 34 provided with a pair of terminals 35 and 36. The terminal board 34 is formed with grooves 37 and 38 which extend from the outer edge of the bobbin to the terminals for facilitating the connection with the terminals 35, 36 of the topposite ends of the exciting coil 33 by passing the latter through the grooves 37, 38 and securing them therein. The terminal board 34 extends by the side of the magnetic plate 26 intermediate its poles 22, through a slot 39 formed in the shading disc 30, by the side of the magnetic plate 27 intermediate its poles 23, and through an opening 40 (FIG. 3) formed in the closed end plate of the casing 8 to the exterior thereof. Five, equi-angularly spaced tabs 41 and 42 extend outwardly from the periphery of the shading discs 30 and 31, respectively, for the convenience of determining the angular positions of the poles 22, 23, 24 and 25. Against the surface of the magnetic plate 29 which is located on the same side as the poles 25 extend is placed a magnetic shield plate 43. The shield plate 43 is formed with recesses 44 along its periphery for allowing the poles 22 to 25 to extend therethrough. A stator coupling sleeve 45 is inserted concentrically into the bobbin 32, and has a reduced diameter at its both ends to form steps 46 and 47. The magnetic plate 26, shading disc 30 and magnetic plate 27 are placed in this sequence on one end of the coupling sleeve 45, while the magnetic plate 28, shading disc 31, magnetic plate 29 and shield plate 43 are placed in sequence on the other end of the coupling sleeve 45, and then the extreme ends of the coupling sleeve 45 are crimped to clamp these members against the steps 46 and 47, respectively. When the exciting coil 33 is supplied with a.c. current, the magnetic plate 26 may be excited to become N-pole, at which time magnetic plate 28 will be S-pole, while both magnetic plates 27 and 29 remain unexcited. At a time which corresponds to a time delay of $\pi/2$ referenced to the period of the supply current, the magnetic plates 27 and 29 are rendered N- and S-poles, respectively, by the function of the shading discs 30 and 31, while the magnetic plates 26 and 28 become unexcited. After another $\pi/2$ period has elapsed, the magnetic plates 26 and 28 are rendered S- and N-poles, respectively, and the magnetic plates 27 and 28 return to non-excited condition. After a further $\pi/2$ period, the magnetic plates 27 and 29 are rendered S- and N-poles while the magnetic plates 26 and 28 are not excited. Thereafter, the process is repeated. Thus, N-poles moves sequentially through the poles 22, 23, 24 and 25, thus producing a rotating field.

The rotor shaft 11 is inserted into the coupling sleeve 45 from the side on which the shield plate 43 is located, with the rotor poles 18 and 19 being disposed in opposing relationship with the stationary poles 20, 21 on the stator. In the illustrated embodiment, the ratio of the number of rotor poles 18 (or 19) to the number of stationary poles 20 and 21 is chosen to be 3:2. Because the stationary poles are 10 in number in the example shown, the number of rotor poles 18 (or 19) is 15.

Figure 7:
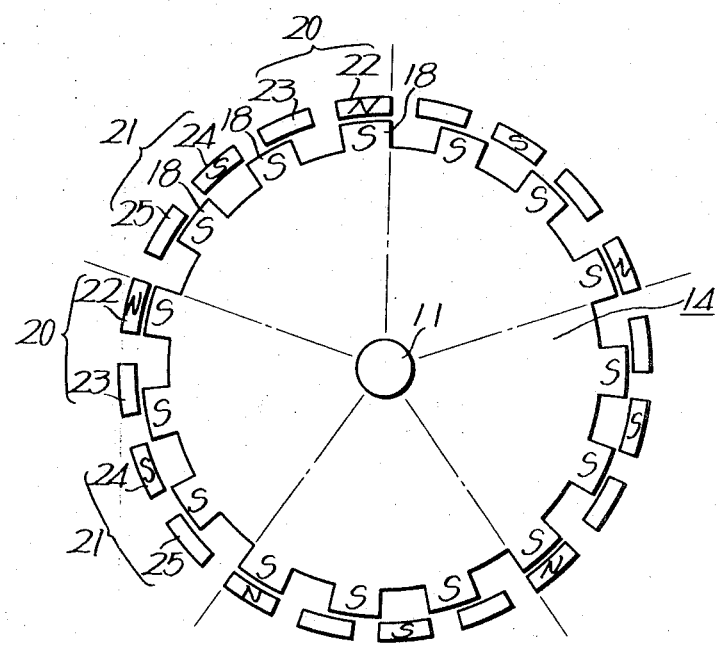
FIG. 7 is a plan view illustrating a rotor having S-poles alone.

In principle, one of the rotor poles 18 or 19 may be omitted. FIG. 7 shows such an example in which poles 19 are removed and only poles 18 magnetized to be S-poles are provided. For purpose of convenience, the operation of the above described motor will be described in connection with the rotor arrangement shown in FIG. 7.

Figure 8A:
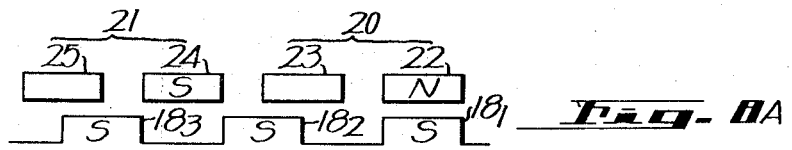
FIG. 8 is a development of the stationary poles and rotor poles of the motor shown in FIG. 7 to illustrate its operation.
Figure 8B:
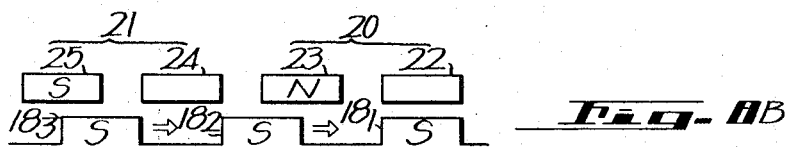
Figure 8B:
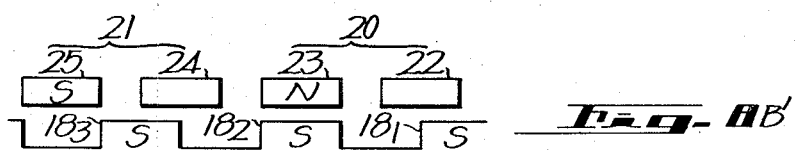
Figure 8C:
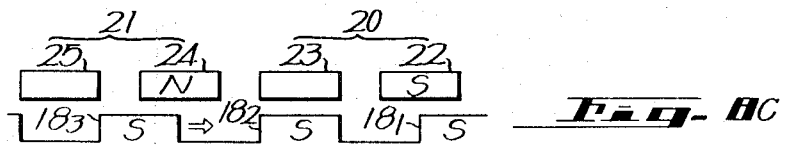
Figure 8C:
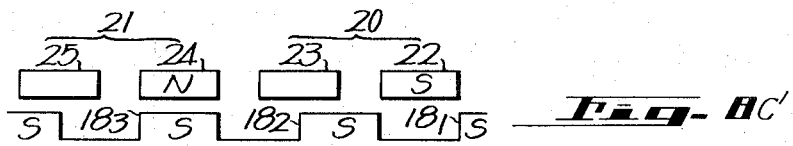
Figure 8D:
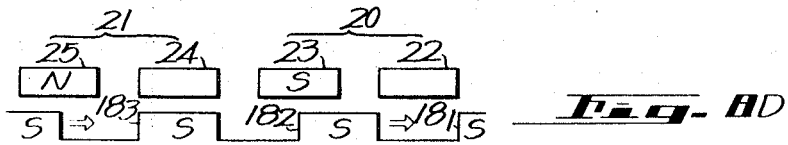
Figure 8D:
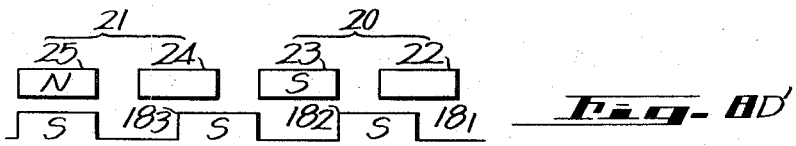
Figure 8E:
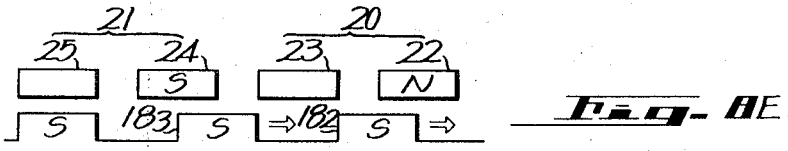
Figure 8E:
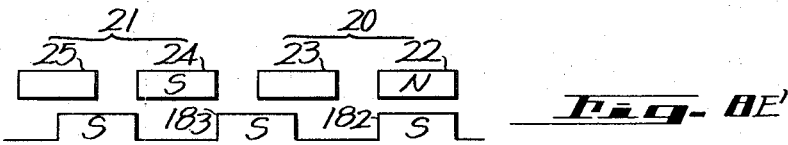

FIG. 8 shows a linear development of the poles 18 and the stationary poles 20 and 21, FIG. 8A shows a stabilized position of the rotor 14 which it assumes when the sub-poles 22, 23, 24 and 25 on the stator are magnetized to be N, O, S and O, respectively, O designating non-magnetization. In this position, the sub-pole 22 which is assumed to be an N-pole at this time attracts a rotor pole $18_1$ which is an S-pole, and the sub-pole 24 which then assumes an S-pole repels rotor poles $18_2$ and $18_3$, which are both S-poles, located on the opposite sides thereof, so that the rotor 14 becomes balanced in the position shown. After a time period corresponding to $\pi/2$ of the period of the current supplied to the exciting coil 33 has elapsed from the condition shown in FIG. 2A, the sub-poles 22, 23, 24 and 25 are excited to be O, N, O and S, respectively, as shown in FIG. 2B. The forces acting upon the rotor 14 at this time are a force of attraction between the sub-pole 23 which then is an N-pole and the rotor pole $18_2$, an S-pole, and a force of repulsion between the rotor pole $18_3$, an S-pole, and the sub-pole 25 which then is an S-pole. Although some other forces may be acting between other sub-poles and rotor poles, they are extremely small as compared with the two forces mentioned above and therefore can be neglected. The above two forces tend to rotate the rotor 14 to the right, as viewed in this Figure, and therefore the rotor rotates to the right until it assumes a stabilized position shown in FIG. 8B'. After another $\pi/2$ period of the current supplied to the exciting coil 33, the polarities of the sub-poles change as shown in FIG. 8C. Now a force of repulsion between the sub-pole 22 which is now an S-pole and the rotor S-pole $18_1$ and a force of attraction between the sub-pole 24 which now assumes an N-pole and the rotor S-pole $18_3$ act on the rotor 14, further rotating the rotor 14 to the right until it reaches a stabilized position shown in FIG. 8C'. Upon subsequent completion of $3/2\pi$ and $2\pi$ periods of the current supplied to the exciting coil 33, the sub-poles on the stator obtain varying polarities as shown in FIGS. 8D and 8E, respectively, and the rotor 14 rotates to the right until it reaches stabilized positions shown in FIGS. 8D' and 8E', respectively. When the rotor 14 reaches the position shown in FIG. 8E', the supply current has undergone its one period from the initial phase shown in FIG. 8A. During such period, one subpole on the stator, as illustrated by sub-pole 22, has experienced a full variation of polarities in the sequence of N-O-S-O-N, and it is noted that during such time, the rotor 14 has rotated by an amount corresponding to one pitch of the rotor poles 18.

It will be seen that the motor illustrated in FIGS. 3 to 7 comprises a combination of five of fundamental patterns, each of which is constituted by two stationary poles and three rotor poles. Because there are 15 poles on the rotor 14, the rotation of the rotor 14 occurs at a rate that is one-fifteenth the frequency of the current supplied to the exciting coil 33. To give an example, with a supply frequency of 50Hz, the rotor 14 rotates at a rate of three and one-third revolutions per second. If a 60Hz supply is used, the rate of rotation of the rotor 14 will be 4 revolutions per second.

By way of comparison, it is seen that a conventional hysteresis motor as illustrated in FIG. 1 will have a rotation of the rotor that occurs at a rate of two pitches of stationary poles or rotor poles for one cycle of the exciting current. In the above described embodiment of the invention, the rate of rotation of the rotor is two-thirds pitch of the stationary poles for one cycle of the exciting current. Thus this embodiment achieves a rotational speed that is one-third as great as the speed of the hysteresis motor, and hence it will be understood that the synchronous motor according to the invention is particularly advantageous for low speed applications.

The total number of stationary poles is determined by how many of the fundamental pattern shown in FIG. 8 is combined together. Thus the minimum construction would be constituted by a single fundamental pattern with two stationary poles and three rotor poles. The motor may comprise a combination of two of fundamental patterns with four stationary poles and six rotor poles, or may comprise a combination of any increased number of fundamental patterns. In either case, a rotational speed that is one-third that of a conventional hysteresis motor is achieved for the same number of stationary poles. As will be noted from FIGS. 8A, 8B', 8C', 8D' and 8E', the operation of the motor according to the invention is characterized by the fact that in a stabilized position of the rotor 14, there exists at least one set of oppositely located and attracting stator sub-pole and rotor pole having opposite polarities and there also exist an even number of sets of repelling stator sub-pole and rotor pole of like polarity which are displaced in the direction of rotation but closely spaced from each other, each two sets of repelling combinations having balanced forces of repulsion to cancel out each other.

While the foregoing description relates to rotor poles constructed as S-poles, it is also possible to construct these rotor poles as N-poles. In such an instance, the rotor will assume a stabilized position as illustrated in FIG. 19. The above description also applied to the operation of the rotor with N-poles alone, if the poles $18_1$, $18_2$ and $18_3$ are replaced by poles $19_1$, $19_2$ and $19_3$ which are displaced by one-half its pitch in either direction along the direction of rotation. Since S-poles and N-poles 19 of the rotor 14 are thus displaced from each other by one-half the pitch both of them can be combined together even if their ends are bent. The rotor 14 shown in FIGS. 3 to 6 is constructed in this manner. This permits a rotor 14 having both S- and N-poles to be simply produced by merely placing the permanent magnet 15 between the both pole plates. For a rotor having both poles 18 and 19, the ratio of stationary pole number to rotor pole number can be said to be 2:6.

While in the foregoing the permanent magnet 15 has been described as axially magnetized, one which is magnetized in a direction perpendicular to the axial direction may be used. One such example is illustrated in FIG. 10. Thus, in this instance, the rotor 14 is magnetized in a direction at right angles to the rotary shaft 11, and at its one end face having S-pole, poles 18 are formed in projecting configuration in a plane parallel to the sheet of drawing while at its other end face having N-pole, poles 19 are similarly formed. Poles 18 and 19 correspond to those illustrated in FIGS. 7 and 9, though they are not formed all around the periphery of the rotor 14 but are formed only at its opposite ends.

Two of such rotors may be super-imposed or juxtaposed with an angular displacement of 180° plus one-half pitch, thereby locating poles 19 intermediate adjacent poles 18.

Figure 11:
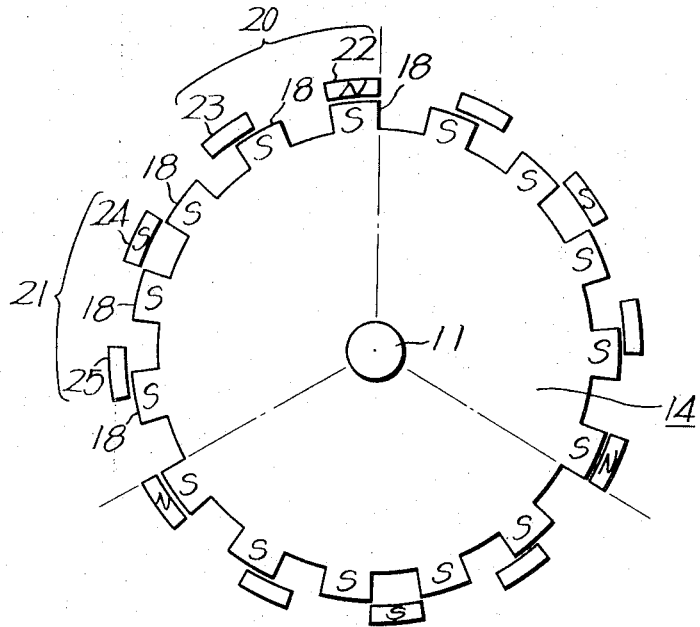
FIG. 11 is a plan view of another embodiment of the invention having a stator pole number to rotor pole number ratio of 2:5.
Figure 12A:
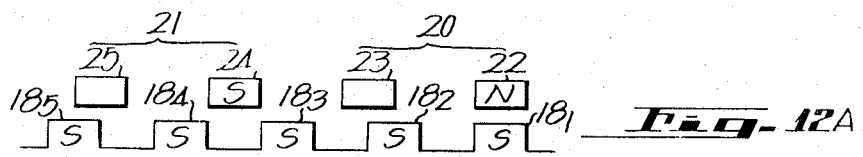
FIG. 12 is a development of the stationary poles and rotor poles of the motor shown in FIG. 11, illustrating its operation.
Figure 12B:
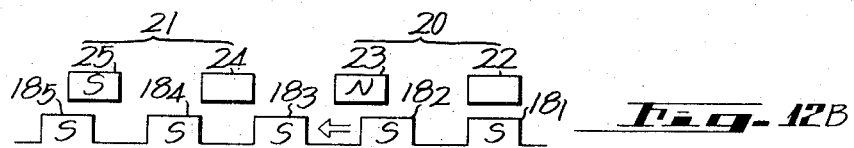
Figure 12B:
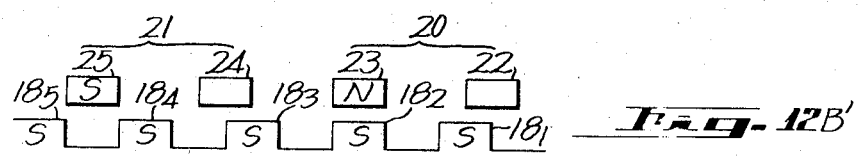
Figure 12C:
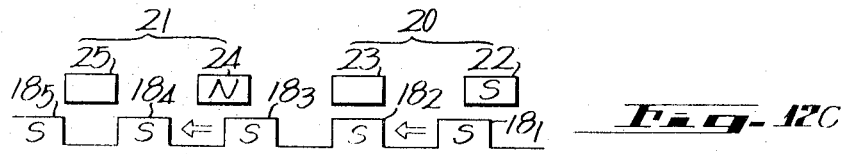
Figure 12C:
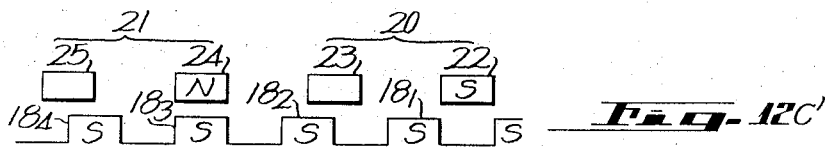
Figure 12D:
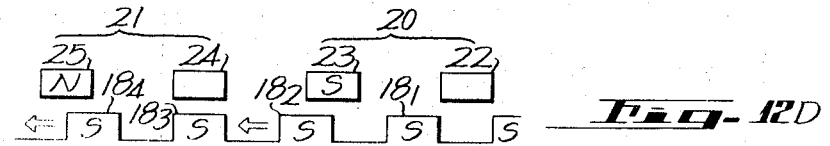
Figure 12D:
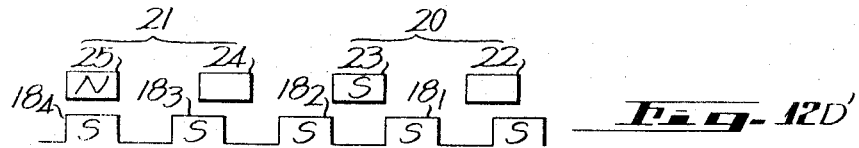
Figure 12E:
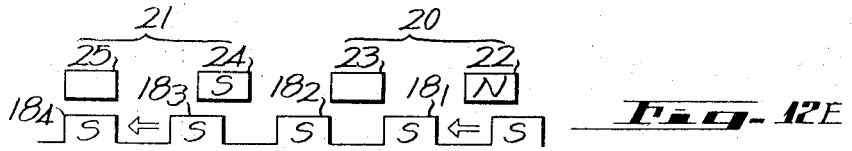
Figure 12E:
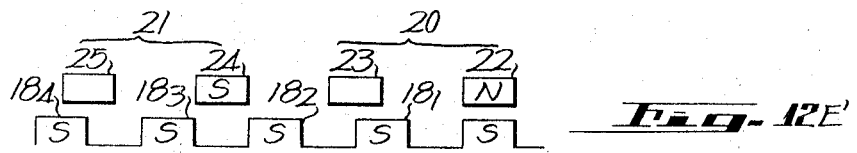

The above description deals with the choice of the number of stationary poles and the number of rotor at a ratio of 2:3. However, similar operation can be achieved with a ratio of 2:5. FIG. 11 illustrates a combination of three sets of such fundamental pattern, which comprise four sub-poles on the stator and five poles on the rotor. FIG. 12 shows a development for explaining the principle of operation. The variation or progression of poles through the stator sub-poles 22, 23, 24 and 25 is the same as described in connection with FIG. 8. In FIG. 12A, the stator sub-pole 22 assumes an N-pole and attracts the rotor S-pole $18_1$, and the stator sub-pole 24 which is then an S-pole exerts a force of repulsion with the rotor S-poles $18_3$ and $18_4$, with result that the rotor 14 is stabilized in the position shown. If then the sub-poles 22, 23, 24 and 25 on the stator change polarity to O, N, O and S, respectively, as shown in FIG. 12B, the stator sub-pole 23 which assumes an N-pole attracts the rotor S-pole $18_2$, and the stator sub-pole 25 which assumes an S-pole repels the rotor S-pole $18_5$. As a result, the rotor 14 rotates to the left until it reaches a stabilized position shown in FIG. 12B' in which the pole $18_2$ is in correct alignment with the sub-pole 23. If the sub-poles 22, 23, 24 and 25 on the stator further changes polarity to S, O, N and O, respectively, as shown in FIG. 12C, the stator sub-pole 22, which is an S-pole, repels the rotor S-pole $18_1$, and the stator sub-pole 24 which is now an N-pole attracts the rotor S-pole $18_3$, with consequence that the rotor 14 rotates to the left until it reaches the position shown in FIG. 12C'. Thereafter, for every change of the phase of the exciting current by an amount of $\pi/2$, the rotor 14 rotates sequentially to the positions shown in FIGS. 12D' and 12E', and eventually when one of the sub-poles on the stator has cycled through N-O-S-O-N, the rotor 14 has rotated by an amount corresponding to one pitch of the poles thereon. As a consequence, for a motor shown in FIG. 11 which combines three sets of the fundamental pattern shown in FIG. 12, the rotor 14 has 15 pitches of poles 18, so that the number of revolutions of the rotor is one-fifteenth the frequency of the a.c. current supplied to the exciting coil 33. In other words, the number of rotation achieved with this embodiment remains the same as the embodiment shown in FIGS. 3 to 7. Also, as noted in FIGS. 12A, 12B', 12C', 12D' and 12E', in each of the stabilized positions of the rotor 14, there is at least one set of correctly aligned and attracting sub-pole and rotor pole of opposite polarities, and there is an even number of sets of repelling sub-pole and rotor pole of like polarity which are displaced in the direction of rotation but closely spaced from each other, the force of repulsion being balanced between two such sets.

Figure 9:
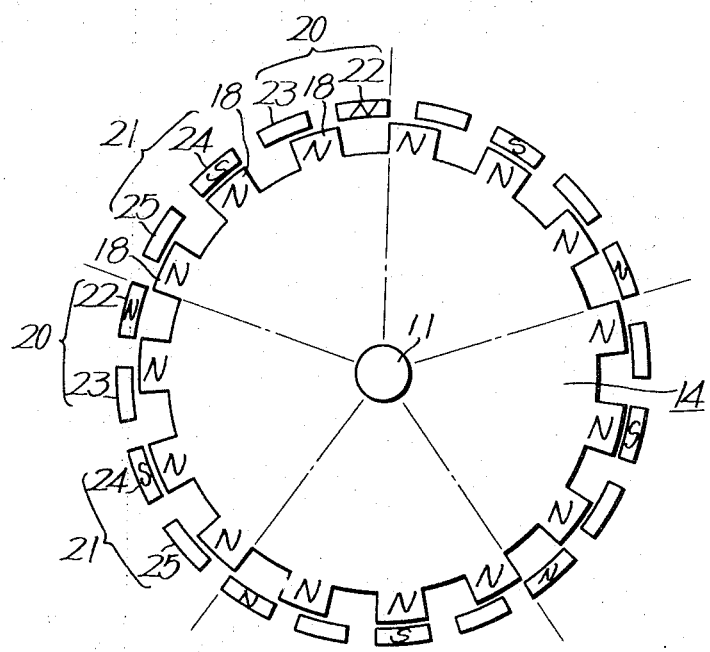
FIG. 9 is a plan view illustrating a rotor having N-poles alone.
Figure 10:
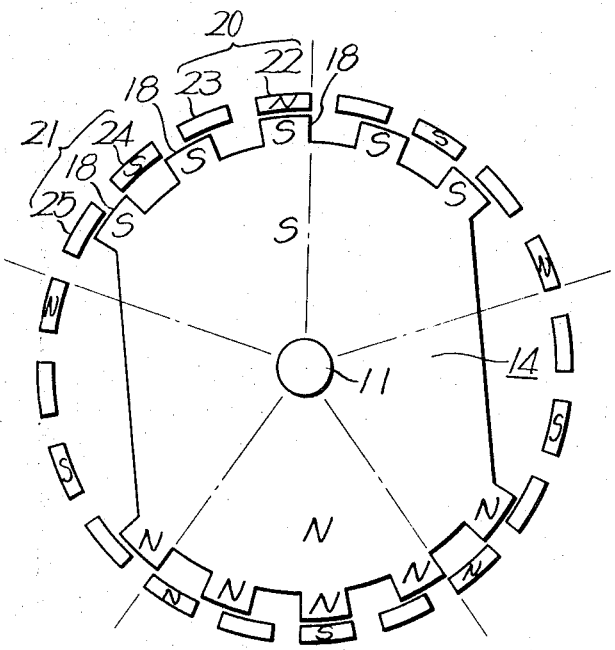
FIG. 10 is a plan view of a motor with separated groups of N- and S-poles.

Also with the choice of 2:5 for the ratio of the number of stationary poles to the number of rotor poles, it is equally possible to construct the rotor poles with N-poles alone as illustrated in FIG. 9, to employ a combination of N- and S-poles for the rotor poles in like manner as described in connection with FIGS. 4 to 6, and to incorporate both N- and S-poles on a single rotor in a manner depicted in FIG. 10. Additionally, the relative positions of the stator and rotor may be interchanged.

Figure 13:
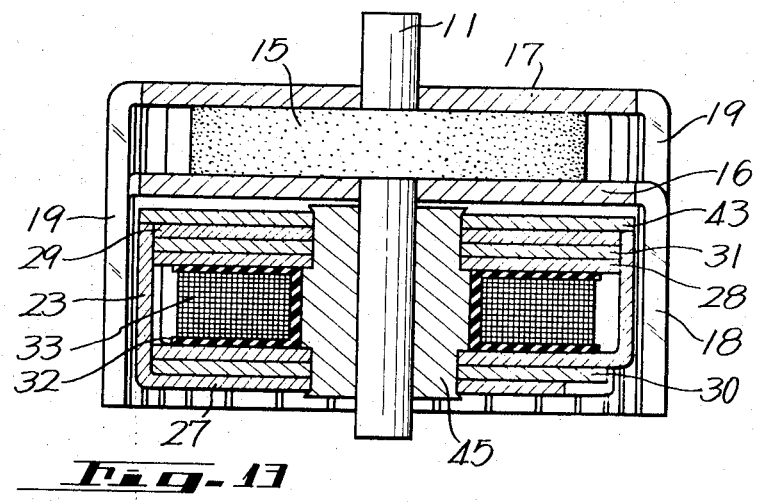
FIG. 13 is a longitudinal section of the motor constructed in accordance with a further embodiment of the invention with a stationary pole number to rotor pole number ratio of 2:10.
Figure 14:
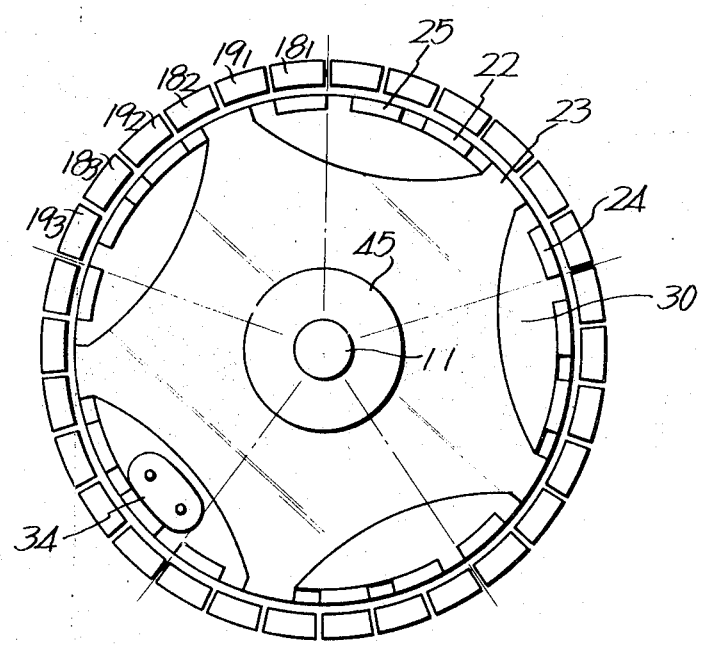
FIG. 14 is a bottom view of the motor shown in FIG. 13.
Figure 15:
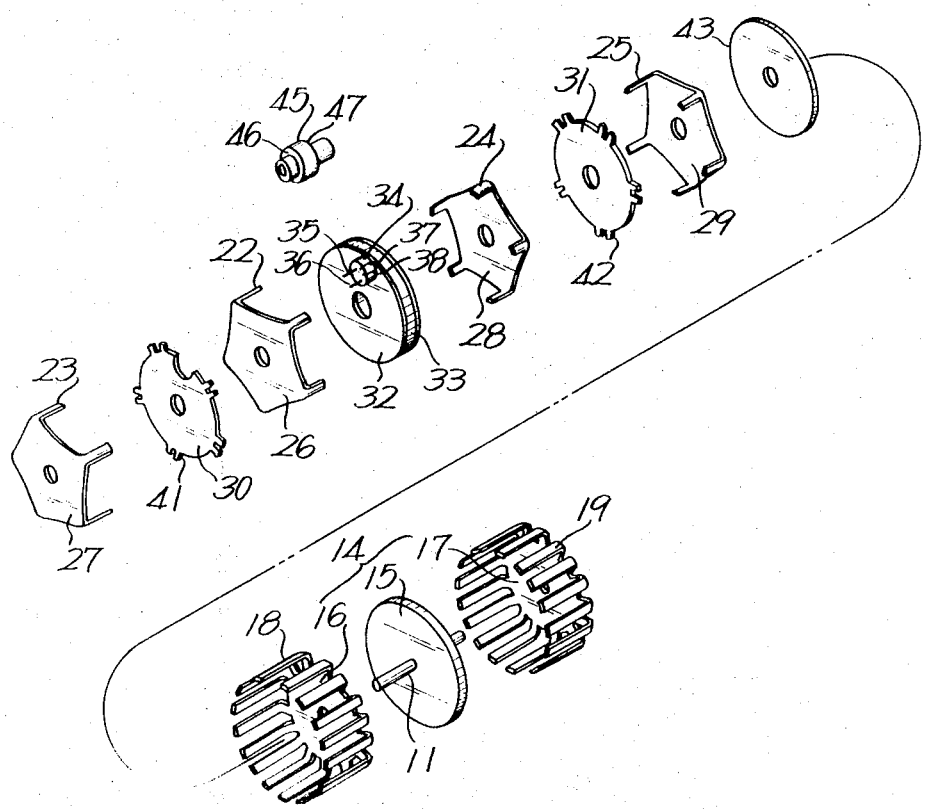
FIG. 15 is an exploded perspective view of the motor shown in FIG. 13.

Thus, FIGS. 13, 14 and 15, which correspond to FIGS. 4, 5 and 6, respectively, shows such an example. In this instance, the stator sub-poles 22 and 23 do not extend beyond the outer peripheral surface of the bobbin 32, while the sub-poles 24 and 25 are bent in a direction reverse to the direction in which the corresponding sub-poles of the previous embodiment extend, and are positioned on the outer peripheral surface of the bobbin 32. Thus the sub-poles 22, 23, 24 and 25 are reduced in length. On the other hand, the poles 18 and 19 on the rotor 14 are bent in a direction toward the stator and lengthened to be positioned around the array of the sub-poles 22, 23, 24 and 25. Shield plate 43 is not formed with positioning recesses, but the shading discs 30 and 31 have a recess formed centrally in each of the tabs 41 and 42 for allowing passage therethrough and positioning of the sub-poles 23 and 25. The rotor 14 shown in FIG. 15 may be replaced by one which comprises a permanent magnet that is magnetized in a direction at right angles to the rotary shaft 11, as illustrated in FIG. 10, with poles 18 and 19 provided on opposite ends of such magnet being bent to extend parallel to the shaft 11.

Figure 17:
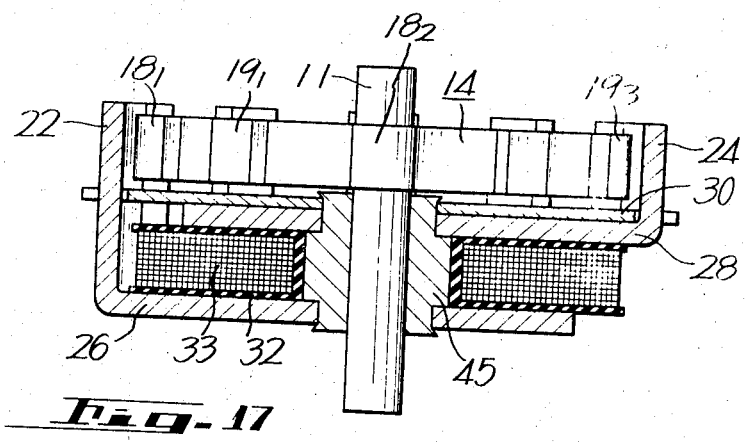
FIG. 17 is a longitudinal section of the motor shown in FIG. 16, the rotor portion being omitted from section.
Figure 18:
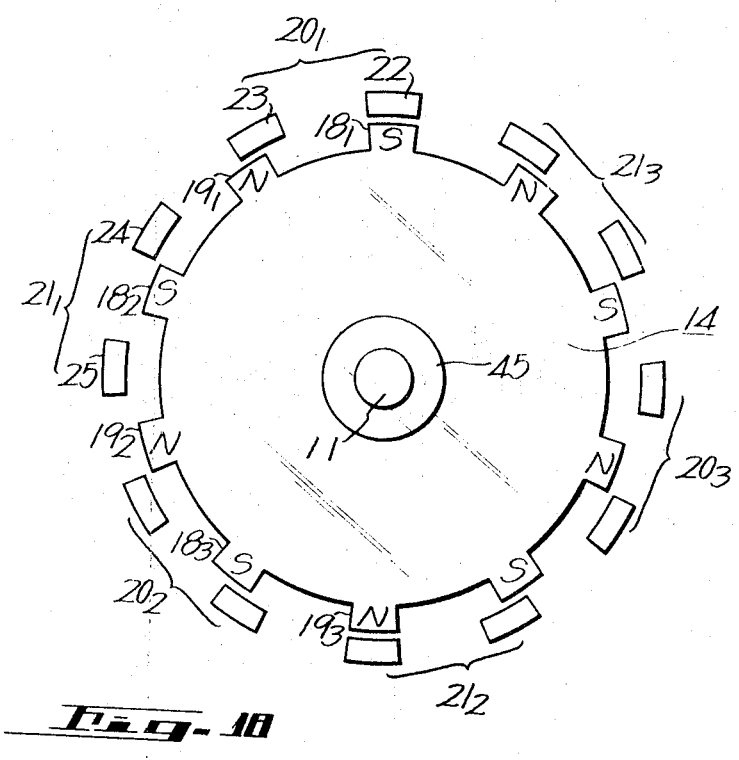
FIG. 18 is a plan view of the motor of FIG. 16.

There have been described in the foregoing several alternative arrangements for choosing the ratio of the number of stationary poles to the number of rotor poles at 2:3, 2:6, 2:5 or 2:10. It is also possible to choose a ratio of 3:5. Such an example will be described below with reference to FIGS. 16 to 18. A magnetic plate 26 is used to form three pairs of sub-poles 22 and 23, each constituting a stationary pole 20, by bending elongate sub-poles from the magnetic plate. Similarly, three pairs of sub-poles 24 and 25, each constituting a stationary pole 21, are formed by bending from a magnetic plate 28. These magnetic plates 26 and 28 are coupled together with an exciting coil 33 interposed therebetween to form an array of stationary poles 20 and 21. Each of the sub-poles 22, 23, 24 and 25 is passed through a small opening 52, 53, 54 or 55, which are formed in a copper shading disc 30 with an equal angular interval adjacent the periphery thereof. Openings 52 and 54 communicate with the outer periphery of the disc 30 through channels extending therebetween. The arrangement is such that when the coil 33 is excited, sub-poles 22 and 24 passing through openings 52 and 54 with channels are immediately magnetized to the polarity of their associated magnetic plates 26 and 28 which are excited by the coil 33, but sub-poles 23 and 25 passing through openings 53 and 55 which are not formed with channels are magnetized to the polarity of their associated magnetic plates 26 and 28 only with a phase lag of $\pi/2$ of the exciting current. In this manner, a rotating field is produced across the array of the stationary poles 20 and 21.

Alternatively, the rotating field may be produced with an arrangement as illustrated in FIGS. 4 to 6 or FIGS. 13 to 15.

The rotor 14 of this embodiment comprises a disc-shaped magnetizable body with 10 teeth formed at an equal angular interval along the periphery thereof. These teeth are directly magnetized to be S- and N-poles alternately to provide poles $18_1$, $19_1$, $18_2$, $19_2$, ... $18_5$, $19_5$.

The operation of this embodiment will be described with reference to FIG. 19 which is a development of the stationary and rotor poles as exemplified by FIG. 8 or FIG. 12, but which is a full development of the stator and rotor poles.

When the sub-poles 22, 23, 24 and 25 on the stator assume the polarities of N, O, S and O, respectively, as shown in FIG. 19A, the rotor 14 is stabilized on account of the attraction between sub-pole 22 (S), this representing that sub-pole 22 is an S-pole at the time involved and such denotation being followed hereinafter, of stationary pole 20, and rotor pole $18_1$ (S), this also representing that rotor pole $18_1$ is an S-pole, as well as the attraction between sub-pole 24 (S) of stationary pole $21_2$. A force of repulsion occurs between sub-pole 24 (S) of stationary pole $21_1$ and rotor pole $18_2$ (S), but is counteracted or cancelled by a force of repulsion between sub-pole 22 (N) of stationary pole $20_2$ and rotor pole $19_2$ (N). Similarly, a force of repulsion occurring between sub-pole 22 (N) of stationary pole $20_3$ and rotor pole $19_4$ (N) is cancelled by a force of repulsion acting between sub-pole 24 (S) of stationary pole $21_3$ and rotor pole $18_5$ (S). Other forces of attraction and of repulsion acting between different combinations of poles may be present, but are small enough to be neglected from consideration. Upon elapsing a $\pi/2$ period of the exciting current, the sub-poles 22, 23, 24 and 25 are excited to be O, N, O and S, respectively, as depicted in FIG. 19B. Then sub-pole 23 (N) of stationary pole 20, repels rotor pole $19_1$ (N) to exert a force driving the rotor 14 to the left as viewed in this Figure. Sub-pole 23 (N) of stationary pole $20_2$ attracts rotor pole $18_3$ (S), sub-pole 25 (S) of stationary pole $21_2$ repels rotor pole $18_4$ (S), and sub-pole 25 (S) of stationary pole $21_3$ attracts rotor pole $19_5$ (N). All these forces impart the rotor 14 a drive to the left, and hence the rotor 14 rotates to the left until it reaches a stabilized position shown in FIG. 19B', in which position sub-pole 23 (N) of stationary pole $20_2$ is in alignment with and attracts rotor pole $18_3$ (S), and also sub-pole 25 (S) of stationary pole $21_3$ is aligned with and attracts rotor pole $19_5$ (N).

Upon elapsing another $\pi/2$ period, the sub-poles 22, 23, 24 and 25 are excited to be S, O, N and O, respectively, as shown in FIG. 19C. Now interaction occurs between sub-pole 22 (S) of stationary pole $20_1$ and rotor pole $18_1$ (S), between sub-pole 22 (S) of stationary pole $20_2$ and rotor pole $19_2$ (N), between sub-pole 24 (N) of stationary pole $21_2$ and rotor pole $19_3$ (N), and between sub-pole 24 (N) of stationary pole $21_3$ and rotor pole $18_5$ (S). All these interactions impart the rotor 14 a drive to the left, and hence the rotor 14 rotates to the stabilized position shown in FIG. 19C'. In this position, sub-pole 22 (S) of stationary pole $20_2$ is aligned with and attracts rotor pole $19_2$ (N) as does sub-pole 24 (N) of stationary pole $21_3$ with rotor pole $18_5$ (S).

After a further $\pi/2$ period, the sub-poles 22, 23, 24 and 25 are excited to be O, N, O and S, respectively, as shown in FIG. 19D. The rotor 14 is further driven to the left in the manner mentioned above until it reaches a stabilized position shown in FIG. 19D'. Upon elapsing the next $\pi/2$ period, or when one cycle of the exciting current has been completed, the excitation of sub-poles on the stator resumes the initial condition as will be noted by comparison of FIG. 19E with FIG. 19A, and the rotor 14 is driven into the position shown in FIG. 19E'.

In this manner, during one cycle of excitation of the stator, the rotor 14 rotates by an amount corresponding to two-thirds times the pitch of the poles thereon. Since there are ten poles on the rotor, the number of revolutions becomes one-fifteenth the frequency of the current supplied to the exciting coil, thus resulting in the same effect as achieved with the above described choice of 2:3 or 2:5 for the ratio of the number of stationary poles to the number of rotor poles. Therefore, for the same number of stationary poles, this embodiment also achieves a rotational speed which is by a factor of 5 less than the rotational speed of a conventional hysteresis motor.

It is only necessary that the ratio of the number of stationary poles to the number of rotor poles remains to be 3:5, and the number of stationary and rotor poles may be increased.

Figure 20:
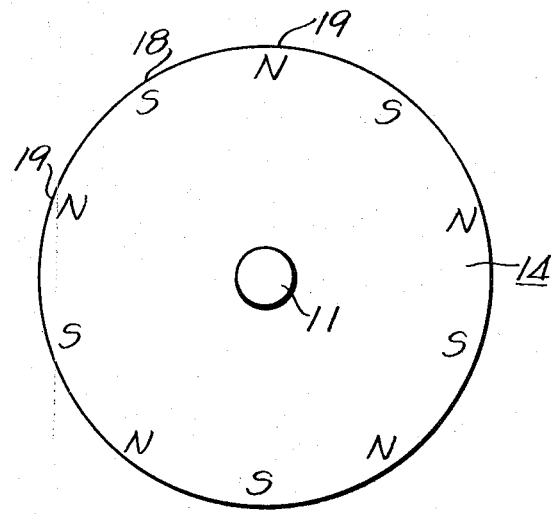
FIG. 20 is a plan view showing another form of the rotor.
Figure 21:
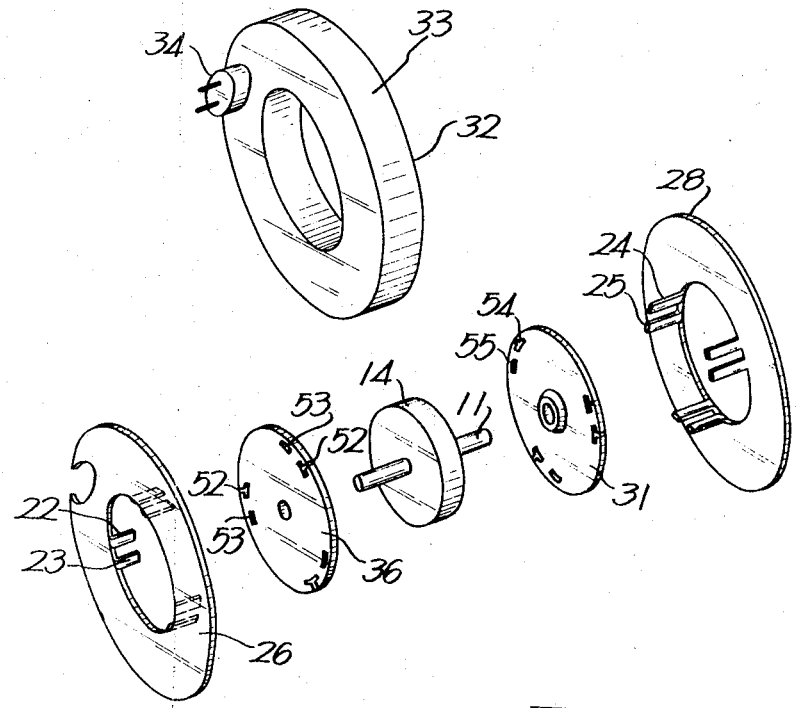
FIG. 21 is an exploded perspective view of a motor having its rotor and exciting coil disposed in a common plane.
Figure 22:
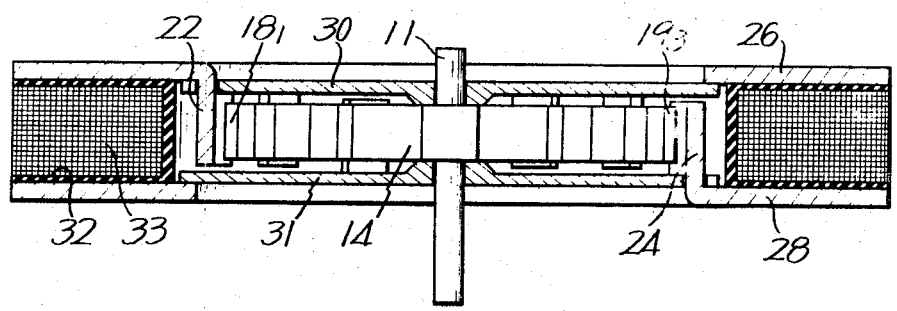
FIG. 22 is a longitudinal section of the assembled motor which is shown in exploded form in FIG. 21.

The rotor 14 may comprise a permanent magnet held sandwiched between a pair of magnetic plates on which poles are formed, as illustrated in FIGS. 4 and 6. Alternatively, it may comprise an annular magnet with alternating N- and S-poles equi-angularly spaced apart along its periphery, such as is shown in FIG. 20, thus avoiding a projecting pole structure. The central portion of the annular magnet is filled, for example, with synthetic resin material. As illustrated in FIGS. 21 and 22, the rotor 14 is disposed concentrically within the bobbin 32, and disc-shaped rings may be used for the magnetic plates 26 and 28. Stationary poles 20 and 21 are formed, as by bending from the rings, so as to extend axially from the inner periphery of the rings, and are positioned intermediate the rotor 14 and the inner periphery of the bobbin 32. This arrangement can be used to provide a flat motor, and is applicable to the stator to rotor pole ratio of 2:3, 2:6, 2:5 or 2:10.

Figure 23:
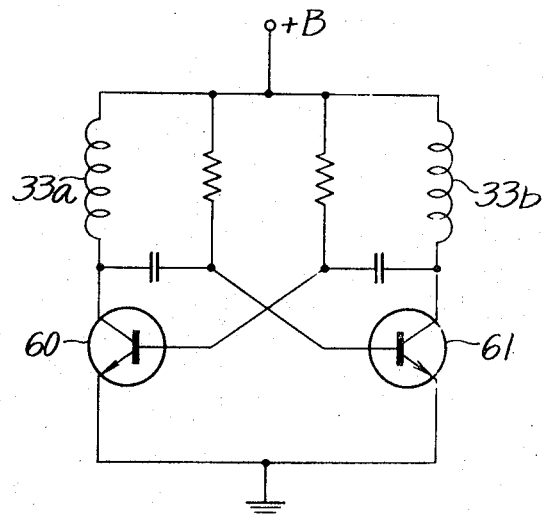
FIG. 23 is a circuit diagram of an astable multivibration that can be used as a source of excitation.

In either embodiment described above, the supply for the exciting coil 33 can be obtained from commercial power supply or a conventional oscillator. The coil can be excited with a two-phase a.c. source. For example, an astable multivibrator can be constructed with transistors 60 and 61 as shown in FIG. 23, and the exciting coil 33 may be divided into two parts 33a and 33b for connection as a load in the collector circuit of the respective transistors 60 and 61. These parts of the coil 32a and 33b are wound in opposite directions on the bobbin 32, and their ends to be connected with the collectors are connected to the terminals 35 and 36, while their junction to be connected with a power supply is connected to a third terminal which is additionally provided on the terminal board 34.

Figure 16:
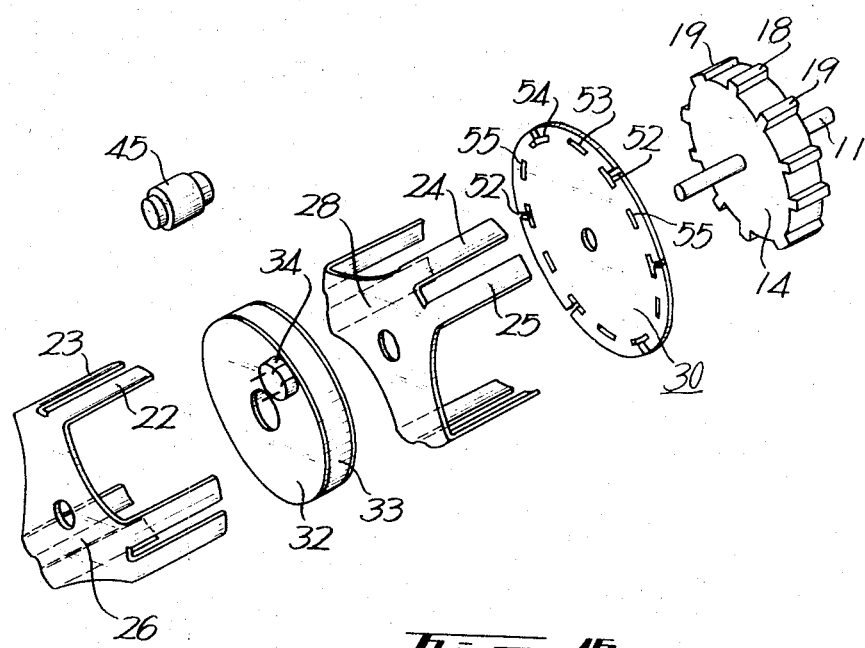
FIG. 16 is an exploded perspective view of still another embodiment of the invention having a stationary pole number to rotor pole number ratio of 3:5.
Figure 24:
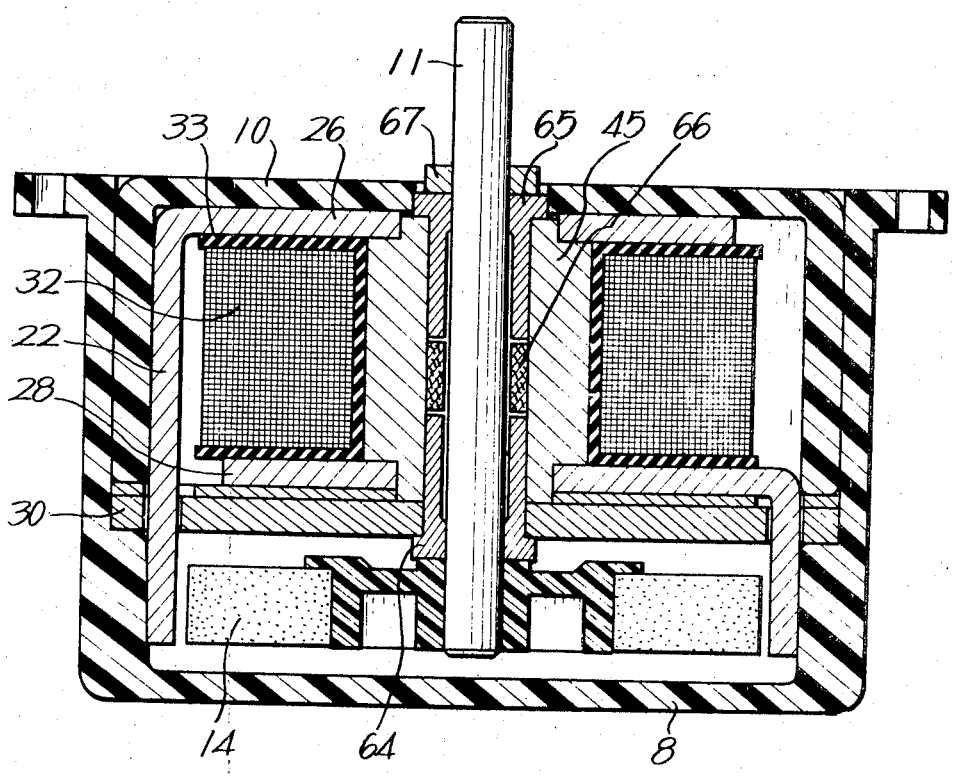
FIG. 24 is a longitudinal section of a practical motor constructed, illustrating numerical figures of various parts.

Referring to FIG. 24, numerical examples will be given. The example shown includes rotor 14 which is of annular magnet type shown in FIG. 20 and has fifteen N-poles and fifteen S-poles. Three pairs of stationary poles 20 and 21 are provided, with a total of twelve sub-poles. A single shading disc 30 shown in FIG. 16 is used, with its periphery held against a step 63 formed on the inner peripheral surface of the casing 8. A hollow cylindrical cover 10 is fitted into the casing 8. The inner end of the cover holds the shading disc 30 against the step 63. Within the coupling sleeve 45 are mounted bearings 64 and 65 for rotatably journalling the rotor shaft 11. A lubricant reservoir 66 such as an annular felt member is provided in the space between the bearings 64 and 65. The rotor shaft 11 extends externally only through the cover 10, and is provided with a pin 67 at a position external of the casing for preventing axial movement.

The rotor 14 is formed by a permanent magnet of barium ferrite having a diameter of 20 mm and a thickness of 3.6 mm. The shading disc 30 is 1.4 mm thick. The exciting coil 33 comprises 12,000 turns of 0.04 mm thick wire, measuring 6.6 kiloohms. The motor operates from an exciting supply of 100 volts, 50 Hz at a number of revolutions of 200 R.P.M., with an output power of 7 gr.cm., and the power consumption under no-load is 1 watt. The minimum starting voltage is 75 volts, and stalling occurs at a minimum of 20 volts. The motor is operable with a voltage in the range from 80 to 115 volts. When the supply frequency is changed to 60 Hz, the number of revolutions increases to 240 R.P.M.

Thus there has been provided in accordance with the invention a low speed motor of small size which operates accurately in synchronism with the frequency of the exciting supply. The motor has a reduced number of rotor and stator poles, and can be readily manufactured. If desired, miniaturization is possible. Thus, it can be used in a variety of instruments without the use of a reduction gearing, and is particularly suitable for use with watches and clocks.

While the invention has been described with reference to particular embodiments thereof, it will be appreciated by those skilled in the art that various changes and modifications can be made therein, and therefore it is intended all such changes and modifications as fall within the scope of the appended claims are covered by the invention.

What is claimed is:

1. A low speed synchronous motor including a rotor formed with a plurality of magnet poles thereon equi-angularly spaced apart with respect to a rotary shaft, and a stator having a plurality of stationary poles disposed in opposing relationship with the magnet poles on the rotor and equi-angularly spaced apart with respect to the rotary shaft, each of said stationary poles consisting of a pair of sub-poles spaced apart in the direction of rotation of the rotor, said stator being adapted to produce a rotating field across the array of the stationary poles; said motor being characterized in that the pitch of the rotor poles is different from the pitch of the stationary poles, and that in a stabilized position of the rotor, there exists at least one set of angularly coincident and attracting stator sub-poles and rotor poles of opposite polarities and there exist an even number of sets of repelling stator sub-poles and rotor poles of like polarity which are angularly closely displaced from each other, said even number of repelling sets producing respective rotating efforts on the rotor which cancel each other.

2. A low speed synchronous motor according to claim 1, in which the ratio of the number of stationary poles to the number of rotor poles is chosen to be 2:3.

3. A low speed synchronous motor according to claim 1, in which the ratio of the number of stationary poles to the number of rotor poles is chosen to be 2:6, and the rotor poles comprises an array of alternating N- and S-poles.

4. A low speed synchronous motor according to claim 1, in which the ratio of the number of stationary poles to the number of rotor poles is chosen to be 2:5.

5. A low speed synchronous motor according to claim 1, in which the ratio of the number of stationary poles to the number of rotor poles is chosen to be 2:10, and the rotor poles comprises an array of alternating N- and S-poles.

6. A low speed synchronous motor according to claim 1, in which the ratio of the number of stationary poles to the number of rotor poles is chosen to be 3:5, and the rotor poles comprises an array of alternating N- and S-poles.

7. A low speed synchronous motor according to claim 1, in which one-half of the rotor is formed with a plurality of S-poles and the other half of the rotor is formed with a plurality of N-poles, the both N- and S-poles having a common pitch and are displaced from each other by the sum of an integral multiple of the pitch an one-half pitch.

* * * * *

UNITED STATES PATENT OFFICE
CERTIFICATE OF CORRECTION

Patent No. 3,790,834  Dated February 5, 1974

Inventor(s) Tetsuro Tanaka

It is certified that error appears in the above-identified patent and that said Letters Patent are hereby corrected as shown below:

In The Heading:

The Assignee's name was omitted. Should be:

-- SHIGERU KAKUBARI, Tokyo, Japan --.

Signed and sealed this 15th day of October 1974.

(SEAL)
Attest:

McCOY M. GIBSON JR.
Attesting Officer

C. MARSHALL DANN
Commissioner of Patents